(12) United States Patent
Eguchi

(10) Patent No.: US 9,148,410 B2
(45) Date of Patent: Sep. 29, 2015

(54) RECORDING MEDIUM STORING DATA PROCESSING PROGRAM, DATA PROCESSING APPARATUS AND DATA PROCESSING SYSTEM

(71) Applicant: FUJITSU LIMITED, Kawasaki (JP)

(72) Inventor: Ichiro Eguchi, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 77 days.

(21) Appl. No.: 13/975,810

(22) Filed: Aug. 26, 2013

(65) Prior Publication Data

US 2014/0089657 A1    Mar. 27, 2014

(30) Foreign Application Priority Data

Sep. 25, 2012   (JP) ................. 2012-211391

(51) Int. Cl.
```
H04L 29/06      (2006.01)
H04L 9/00       (2006.01)
G06F 21/60      (2013.01)
```

(52) U.S. Cl.
CPC .......... *H04L 63/0428* (2013.01); *G06F 21/602* (2013.01); *H04L 9/00* (2013.01)

(58) Field of Classification Search
None
See application file for complete search history.

(56) References Cited

U.S. PATENT DOCUMENTS

2005/0268094 A1* 12/2005 Kohan et al. ................ 713/165
2008/0170686 A1*  7/2008 Nemoto et al. ............... 380/42
2011/0040985 A1   2/2011 Tsuchiya

FOREIGN PATENT DOCUMENTS

WO    WO2009/078182    6/2009

* cited by examiner

*Primary Examiner* — Fatoumata Traore
(74) *Attorney, Agent, or Firm* — Staas & Halsey LLP

(57) ABSTRACT

A computer-readable storage medium stores a data processing program for causing a computer to execute a process. The process includes: identifying a first combination of first data and second data based on a predetermined condition from a storage in which the first data and first ciphered data obtained by ciphering the first data are correspondently stored, and the second data and second ciphered data obtained by ciphering the second data are correspondently stored; extracting a second combination of the first ciphered data and the second ciphered data stored respectively and correspondently to the first data and the second data identified by the identifying; and transmitting the second combination of the first ciphered data and the second ciphered data extracted by the extracting to an external device.

12 Claims, 24 Drawing Sheets

FIG. 6

SET A

| ID | SEX | AMOUNT | FREQUENCY OF USE | OTHERS |
|---|---|---|---|---|
| USER-001 | MALE | 120000 | 3 | — |
| USER-XXX | MALE | 1000 | 4 | ○ |
| USER-YYY | FEMALE | 5000 | 2 | — |

FIG. 8

| DATA GROUP | CIPHERED ITEM NAME | NON-CIPHERED DATA | CIPHERED DATA |
|---|---|---|---|
| SET A | ID | USER-001 | A.REC 1 |
| SET A | ID | USER-XXX | A.REC 2 |
| SET A | ID | USER-YYY | A.REC 3 |

FIG. 9

SET A

| USER NAME | SEX | AMOUNT | FREQUENCY OF USE | OTHERS |
|---|---|---|---|---|
| A.REC 1 | MALE | 120000 | 3 | — |
| A.REC 2 | MALE | 1000 | 4 | ○ |
| A.REC 3 | FEMALE | 5000 | 2 | — |

FIG. 10

SET B

| BRANCH NO | ID | AMOUNT | TYPE 1 | TYPE 2 |
|---|---|---|---|---|
| A | USER-xxx | 300 | VIDEO | 1 |
| A | USER-yyy | 10000 | BAG | 2 |
| A | USER-001 | 200 | AUDIO | 3 |

FIG. 11

SET B

| BRANCH NO | ID | AMOUNT | TYPE 1 | TYPE 2 |
|---|---|---|---|---|
| A | B.REC 1 | 300 | VIDEO | 1 |
| A | B.REC 2 | 10000 | BAG | 2 |
| A | B.REC 3 | 200 | AUDIO | 3 |

FIG. 12

| DATA GROUP | CIPHERED ITEM NAME | NON-CIPHERED DATA | CIPHERED DATA |
|---|---|---|---|
| SET A | ID | USER-001 | A.REC 1 |
| SET A | ID | USER-XXX | A.REC 2 |
| SET A | ID | USER-YYY | A.REC 3 |
| SET B | ID | USER-xxx | B.REC 1 |
| SET B | ID | USER-yyy | B.REC 2 |
| SET B | ID | USER-001 | B.REC 3 |

FIG. 14

| CONDITION 1 | CIPHERED DATA 1 | CONDITION 2 | CIPHERED DATA 2 |
|---|---|---|---|
| SET A.ID | A.REC 1 | SET B.ID | B.REC 3 |

FIG. 15

| SET A.ID | SET A.AMOUNT | SET B.TYPE 1 | SET B.TYPE 2 |
|---|---|---|---|
| A.REC 1 | 120000 | AUDIO | 3 |

FIG. 16

HOSPITAL A

| NAME | INSURED PERSON NUMBER | DISEASE | HEALTH INSURANCE CLAIM |
|---|---|---|---|
| TARO FUJI | A000001-11 | GASTRIC ULCER | 10 |
| TORU HITACHI | B000001-22 | INFLUENZA | 20 |
| RYO UESHIMA | C000001-33 | INFLUENZA | 30 |

FIG. 17

HOSPITAL B

| INSURED PERSON NUMBER | NAME | AGE | DISEASE | DATE OF FIRST MEDICAL EXAMINATION | HEALTH INSURANCE CLAIM |
|---|---|---|---|---|---|
| C000001-33 | RYO UESHIMA | 50 | FRACTURE | 2012/12/1 | 22 |
| U011111-55 | YUJI INOUE | 40 | ASTHMA | 1992/4/5 | 32 |
| A000001-11 | TARO FUJI | 22 | INFLUENZA | 2010/3/4 | 33 |

FIG. 18

HOSPITAL C

| NAME | INSURED PERSON NUMBER | FREQUENCY | HEALTH INSURANCE CLAIM | DISEASE |
|---|---|---|---|---|
| KYOKO KATO | X44444-33 | 4 | 121 | RHINITIS |
| RYO UESHIMA | C000001-33 | 1 | 17 | INFLUENZA |
| KEISUKE KUDO | I011111-55 | 1 | 31 | INFLUENZA |

FIG. 19

HOSPITAL A

| NAME | INSURED PERSON NUMBER | DISEASE | HEALTH INSURANCE CLAIM |
|---|---|---|---|
| * * * * | A.REC 1 | GASTRIC ULCER | 10 |
| * * * * | A.REC 2 | INFLUENZA | 20 |
| * * * * | A.REC 3 | INFLUENZA | 30 |

FIG. 20

HOSPITAL B

| INSURED PERSON NUMBER | NAME | AGE | DISEASE | DATE OF FIRST MEDICAL EXAMINATION | HEALTH INSURANCE CLAIM |
|---|---|---|---|---|---|
| B.REC 11 | **** | 50 | FRACTURE | 2012/12/1 | 22 |
| B.REC 21 | **** | 40 | ASTHMA | 1992/4/5 | 32 |
| B.REC 31 | **** | 22 | INFLUENZA | 2010/3/4 | 33 |

FIG. 21

HOSPITAL C

| NAME | INSURED PERSON NUMBER | FREQUENCY | HEALTH INSURANCE CLAIM | DISEASE |
|---|---|---|---|---|
| * * * * | C.REC 12 | 4 | 121 | RHINITIS |
| * * * * | C.REC 133 | 1 | 17 | INFLUENZA |
| * * * * | C.REC 144 | 1 | 31 | INFLUENZA |

FIG. 22

| DATA GROUP | CIPHERED ITEM NAME | NON-CIPHERED DATA | CIPHERED DATA |
|---|---|---|---|
| HOSPITAL A | INSURED PERSON NUMBER | A000001-11 | A.REC 1 |
| HOSPITAL A | INSURED PERSON NUMBER | B000001-22 | A.REC 2 |
| HOSPITAL A | INSURED PERSON NUMBER | C000001-33 | A.REC 3 |
| HOSPITAL B | INSURED PERSON NUMBER | C000001-33 | B.REC 11 |
| HOSPITAL B | INSURED PERSON NUMBER | U011111-55 | B.REC 21 |
| HOSPITAL B | INSURED PERSON NUMBER | A000001-11 | B.REC 31 |
| HOSPITAL C | INSURED PERSON NUMBER | X44444-33 | C.REC 12 |
| HOSPITAL C | INSURED PERSON NUMBER | C000001-33 | C.REC 133 |
| HOSPITAL C | INSURED PERSON NUMBER | I011111-55 | C.REC 144 |

FIG. 23

| CONDITION 1 | CIPHERED DATA 1 | CONDITION 2 | CIPHERED DATA 2 | CONDITION 3 | CIPHERED DATA 3 |
|---|---|---|---|---|---|
| HOSPITAL A.INSURED PERSON NUMBER | A.REC 1 | HOSPITAL B.INSURED PERSON NUMBER | B.REC 31 | | |
| HOSPITAL A.INSURED PERSON NUMBER | A.REC 3 | HOSPITAL B.INSURED PERSON NUMBER | B.REC 11 | HOSPITAL C.INSURED PERSON NUMBER | C.REC 133 |

FIG. 24

| INSURED PERSON NUMBER | NUMBER OF HOSPITALS | DISEASE 1 | DISEASE 2 | DISEASE 3 | DISEASE 4 | DISEASE 5 | TOTAL OF HEALTH INSURANCE CLAIMS |
|---|---|---|---|---|---|---|---|
| A.REC 1 | 2 | GASTRIC ULCER | INFLUENZA | | | | 43 |
| A.REC 3 | 3 | INFLUENZA | FRACTURE | INFLUENZA | | | 69 |

RECORDING MEDIUM STORING DATA PROCESSING PROGRAM, DATA PROCESSING APPARATUS AND DATA PROCESSING SYSTEM

CROSS-REFERENCE TO RELATED APPLICATIONS

This application is based upon and claims the benefit of priority of the prior Japanese Patent Application No. 2012-211391 filed on Sep. 25, 2012, the entire contents of which are incorporated herein by reference.

FIELD

The embodiments discussed herein are related to a technology for utilizing ciphered data.

BACKGROUND

In a system for storing personal information such as, for example, customer information, there exists a technology for suppressing an information leakage. For example, when the system utilizes data including personal information, the data may be ciphered by replacing a portion related to personal information with somewhat different data from original data.

Also, in a system for transferring data of one user to another user, there exists a technology for generating different data based on stored data, and further generating information to be disclosed using the generated data.

There is a case where a system performs a processing such as, for example, an optional selection or a group division for target data in order to utilize the data. For example, the system may perform a processing such as, for example, compressing and totaling of some records satisfying a predetermined condition from a table including many records, combining a plurality of records stored in different tables, or deleting of duplicated records.

However, when the contents (values) of a portion of record are ciphered by being replaced with other contents having no relationship with the original contents, the system may not identify the relationship among a plurality of records. For example, if the system is not able to determine whether or not the plurality of records stored in a table are for the same person, there occurs a problem in utilizing data. In other words, there is a problem in that the system may not be able to perform some processing such as data compression based on ciphered values, or combining the records using the ciphered values as a key.

International Publication Pamphlet No. WO2009/078182 is known as an example of related art.

SUMMARY

According to an aspect of the invention, a computer-readable storage medium stores a data processing program for causing a computer to execute a process. The process includes: identifying a first combination of first data and second data based on a predetermined condition from a storage in which the first data and first ciphered data obtained by ciphering the first data are correspondently stored, and the second data and second ciphered data obtained by ciphering the second data are correspondently stored; extracting a second combination of the first ciphered data and the second ciphered data stored respectively and correspondently to the first data and the second data identified by the identifying; and transmitting the second combination of the first ciphered data and the second ciphered data extracted by the extracting to an external device.

The objects and advantages of the invention will be realized and attained by means of the elements and combinations particularly pointed out in the claims. It is to be understood that both the foregoing general description and the following detailed description are exemplary and explanatory and are not restirctive of the invention, as claimed.

BRIEF DESCRIPTION OF DRAWINGS

FIG. 6 is a view illustrating one example of data stored in a raw data table.

FIG. 8 is a view illustrating one example of a cipher management table stored in a cipher management data storage unit 204.

FIG. 9 is a view illustrating one example of data registered in a ciphered data table.

FIG. 10 is a view illustrating another example of data stored in a raw data table.

FIG. 11 is a view illustrating another example of data stored in a ciphered data table.

FIG. 12 is a view illustrating another example of data registered in a cipher management table.

FIG. 14 is a view illustrating one example of a combination of ciphered data.

FIG. 15 is a view illustrating one example of combined ciphered data.

FIG. 16 is a view illustrating one example of raw data.

FIG. 17 is a view illustrating another example of raw data.

FIG. 18 is a view illustrating a further example of raw data.

FIG. 19 is a view illustrating one example of a ciphered data table according to a modified exemplary embodiment.

FIG. 20 is a view illustrating another example of a ciphered data table according to the modified exemplary embodiment.

FIG. 21 is a view illustrating a further example of a ciphered data table according to the modified exemplary embodiment.

FIG. 22 is a view illustrating one example of a cipher management table according to the modified exemplary embodiment.

FIG. 23 is a view illustrating one example of a combination of ciphered data according to the modified exemplary embodiment.

FIG. 24 is a view illustrating one example of a processed result.

DESCRIPTION OF EMBODIMENTS

An example of an aspect of the present disclosure is to provide a technology that allows the ciphered data to be easily utilized.

Hereinafter, a system according to the present exemplary embodiment will be described with reference to accompanying drawings. The configuration according to the following embodiment is exemplary only, and the system according to the present disclosure is not limited thereto.

Figure 1:
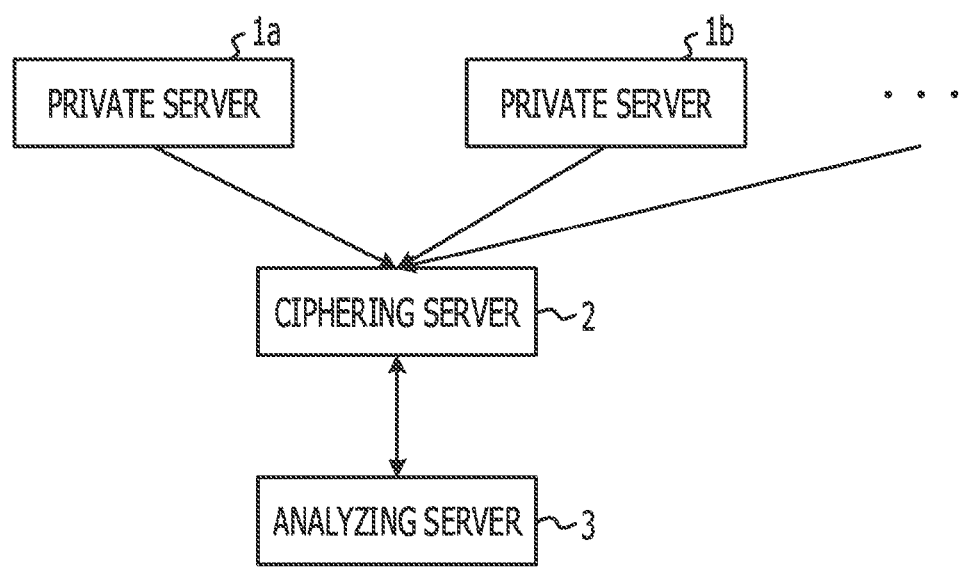
FIG. 1 is a view illustrating one example of a system configuration according to the present exemplary embodiment.

FIG. 1 illustrates one example of a system configuration according to the present exemplary embodiment. The system according to the present exemplary embodiment has a plurality of private servers 1 (illustrated as 1a, 1b . . . in FIG. 1), a ciphering server 2, and an analyzing server 3. The private servers 1 have a business data base (DB) on which, for example, business data are registered. Also, in the present exemplary embodiment, the business data indicates data accumulated in a business, which includes contents that people do not want to disclose outside, such as, for example, personal information. Also, it is assumed that the personal information indicates information that may violate personal privacy if it is known to a third person. In the present exemplary embodiment, non-ciphered business data are referred to as raw data.

The private servers 1 and the ciphering server 2 are connected to each other via a network. The ciphering server 2 receives the raw data from the private servers 1. Then, the ciphering server 2 ciphers, for example, the personal information among the received raw data by replacing the personal information with different data, and generates ciphered business data. The ciphered business data include ciphered personal information and other non-ciphered information.

The ciphering server 2 and the analyzing server 3 are connected to each other via a network. The analyzing server 3 receives the ciphered business data from the ciphering server 2, and then, performs an analysis process such as, for example, data mining, by using the ciphered business data. Also, the analyzing server 3 may ask the ciphering server 2 for data indicating the relationship with the ciphered data, and then obtain information indicating the combination of relevant data from the ciphering server 2.

Also, although the plurality of private servers 1 are illustrated in the example of FIG. 1, only one private server 1 may be used. Also, at least one of the ciphering server 2 and the analyzing server 3 may include a plurality of servers in the configuration, so that the plurality of ciphering servers 2 or the plurality of analyzing servers 3 may perform processing in parallel.

Figure 2:
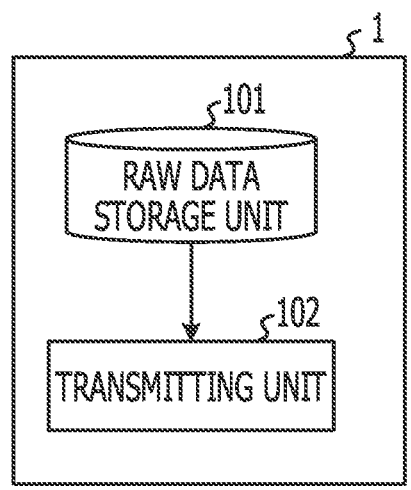
FIG. 2 is a view illustrating one example of a functional block diagram of a private server 1.

FIG. 2 illustrates one example of a functional block diagram of the private server 1. The private server 1 includes a raw data storage unit 101 configured to store the raw data, and a transmitting unit 102. The raw data storage unit 101 stores the business data that includes, for example, the personal information. Also, the transmitting unit 102 is connected to the raw data storage unit 101. The transmitting unit 102 reads out the raw data from the raw data storage unit 101, and transmits the read out raw data to the ciphering server 2. Also, the private server 1 may include a processing unit (not illustrated) so that the raw data may be stored in the raw data storage unit 101 during the operational processing performed by the processing unit.

Figure 3:
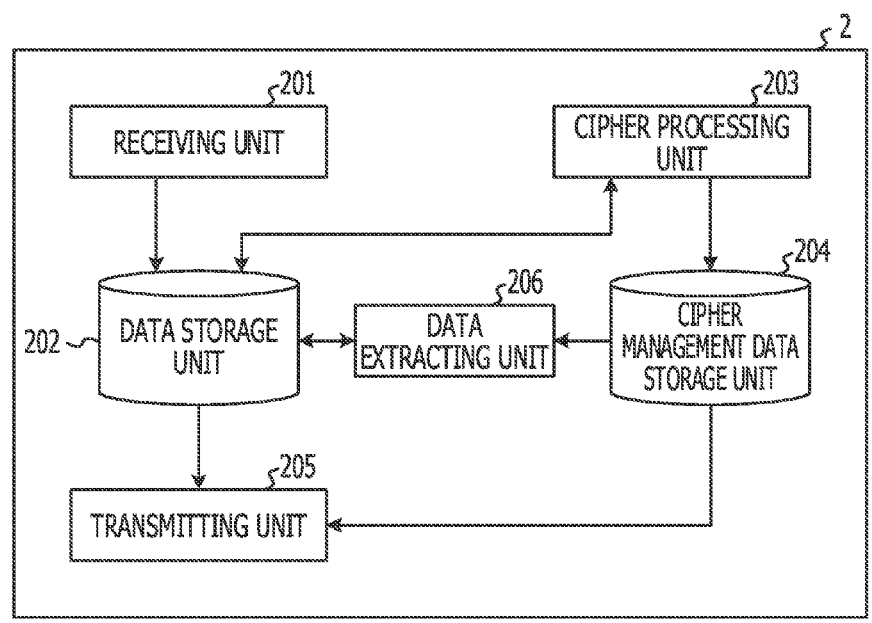
FIG. 3 is a view illustrating one example of a functional block diagram of a ciphering server 2.

FIG. 3 illustrates one example of a functional block diagram of the ciphering server 2. The ciphering server 2 includes a receiving unit 201, a data storage unit 202, a cipher processing unit 203, a cipher management data storage unit 204, a transmitting unit 205, and a data extracting unit 206. The receiving unit 201 receives the raw data from the private server 1, and stores the received raw data in the data storage unit 202. The data storage unit 202 stores, for example, the raw data, the ciphered business data, setting data indicating a cipher-targeted item among the raw data. The cipher processing unit 203 reads out the raw data and the setting data from the data storage unit 202, and replaces the contents of the item to be ciphered among the raw data with different data from the original data so as to generate the ciphered business data. Also, the cipher processing unit 203 stores the ciphered business data in the data storage unit 202 while storing the ciphered data and non-ciphered data corresponding to the ciphered data in the cipher management data storage unit 204. Also, the transmitting unit 205 reads out the ciphered business data from the data storage unit 202, and transmits the ciphered business data to the analyzing server 3.

Also, in the present exemplary embodiment, the receiving unit 201 receives a request for processing such as for example, data extraction on the raw data or the ciphered business data from the analyzing server 3. The data extracting unit 206 analyzes a processing condition included in the processing request to extract, for example, an item (also represented by a column) included in the condition. Then, the data extracting unit 206 identifies a combination of records having identical non-ciphered contents registered in, for example, the extracted item from the cipher management data storage unit 204, and extracts a combination of the ciphered data that are stored correspondently to non-ciphered data in the identified records. Then, the transmitting unit 205 transmits the extracted combination of the ciphered data to the analyzing server 3.

Figure 4:
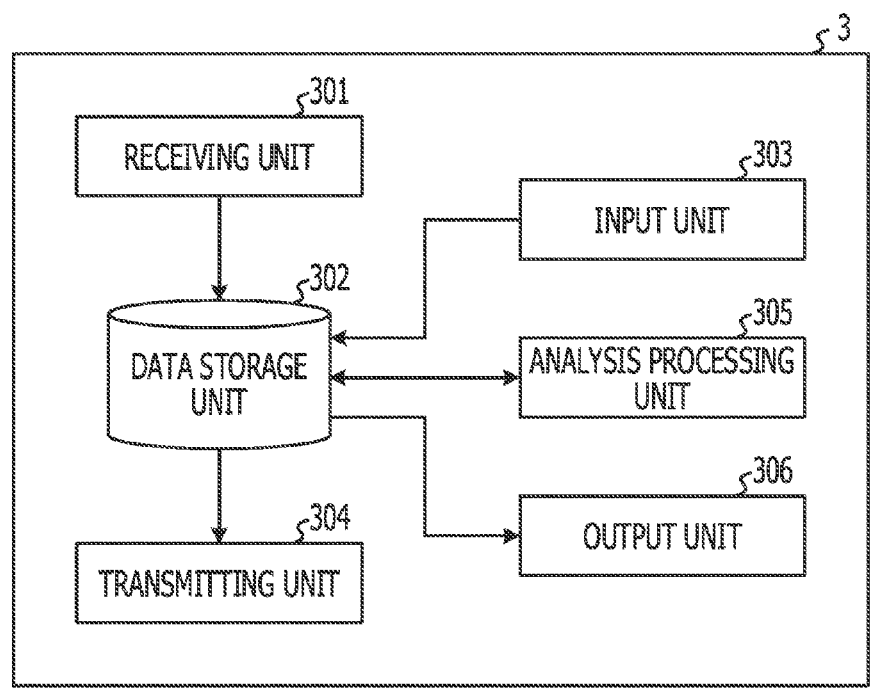
FIG. 4 is a view illustrating one example of a functional block diagram of an analyzing server 3.

FIG. 4 illustrates one example of a functional block diagram of the analyzing server 3. The analyzing server 3 includes a receiving unit 301, a data storage unit 302, an input unit 303, a transmitting unit 304, an analysis processing unit 305, and an output unit 306. The receiving unit 301 receives the ciphered business data or the combination of corresponding ciphered data from the ciphering server 2, and stores the received data in the data storage unit 302. Also, the input unit 303 receives input of a command for analyzing the business data from, for example, a user, and stores the received input in the data storage unit 302. This command is input by, for example, a query of an SQL. Also, this command may be input from another terminal device via the receiving unit 301. In this case, the input unit 303 may not be provided. Also, the transmitting unit 304, based on the input command, transmits a processing request to the ciphering server 2 which requests the ciphering server 2 to transmit the combination of corresponding ciphered data. Also, the analysis processing unit 305 performs an analysis on the business data based on the input command, the ciphered business data stored in the data storage unit 302, and the combination of corresponding ciphered data, and stores the result of the analysis data in the storage unit 302. Also, the output unit 306 outputs, for example, the ciphered business data or the analysis result from the data storage unit 302. Also, instead of making the output unit 306 to output the data, the transmitting unit 304 may transmit the data to another terminal device. In this case, the output unit 306 may not be provided.

Figure 5:
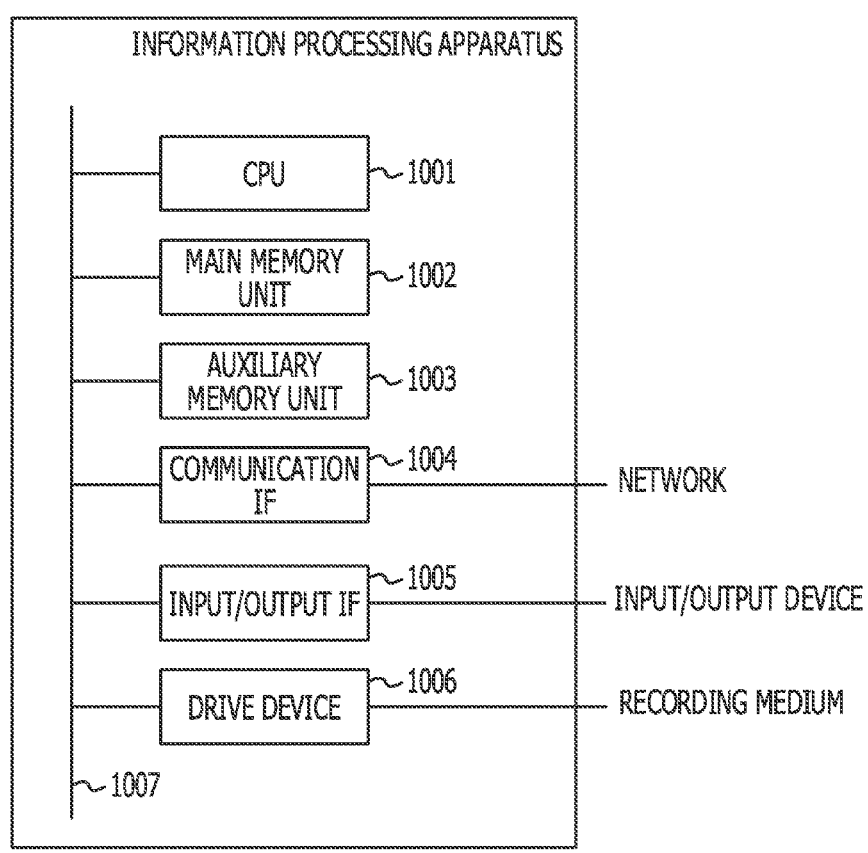
FIG. 5 is a view illustrating one example of the configuration of an information processing apparatus.

FIG. 5 illustrates one example of the configuration of an information processing apparatus. The information processing apparatus may be the private server 1, the ciphering server 2, or the analyzing server 3, which is provided with a central processing unit (CPU) 1001, a main memory unit 1002, an auxiliary memory unit 1003, a communication Interface (IF) 1004, an input/output IF 1005, a drive device 1006, and a communication bus 1007. The CPU 1001 performs processing described in the present exemplary embodiment by executing a program. The main memory unit 1002 is, for example, a random access memory (RAM) or a read only memory (ROM). The main memory unit 1002 caches the program or data read out by the CPU 1001, or expands the operational area of the CPU 1001. The auxiliary memory unit 1003 is, for example, a hard-disk drive (HDD), a solid state drive (SSD), or a flash memory. The auxiliary memory unit 1003 records various data including database or the program executed by the CPU 1001 therein. The communication IF 1004 transmits and receives data between another computer device. The communication IF 1004 is, for example, a wired or wireless network card. The input/output IF 1005 may be connected to, for example, a keyboard or a mouse to receive input from a user, or may be connected to, for example, a display or a printer to output data. Also, the input/output IF may be connected to a device, such as a touch panel, configured to perform input and output process. The drive device 1006 reads out data recorded in, for example, a flexible disk, a compact disc (CD), a digital versatile disc (DVD), or a Blu-ray disc (BD). The components as described above are connected via the communication bus 1007. Also, each of the components may be provided in plural numbers. The program to be executed by the CPU 1001 may be provided through the exemplified discs, a flash memory such as, for example, a USB memory, and other portable recording media. Also, when the CPU 1001 executes the program, the information processing apparatus is operated as the private server 1, the ciphering server 2 or the analyzing server 3.

<Cipher Process>

Hereinafter, a cipher process for ciphering a portion or the entire of raw data will be described. Also, it is assumed that the transmitting unit 102 of the private server 1 has read out the raw data stored in the raw data storage unit 101 and transmitted the read-out raw data to the ciphering server 2 in advance. Meanwhile, it is assumed that the receiving unit 201 of the ciphering server 2 has received the raw data from the private server 1, and has stored the received raw data in the data storage unit 202. It is also assumed that in the data storage unit 202, for example, a raw data table (hereinafter, referred to as a "set A") as illustrated in FIG. 6 is stored, in which the received raw data are registered. Also, it is assumed that in the data storage unit 202, a setting table (not illustrated) is stored, and in the setting table, information (e.g., "ID") indicating a cipher-targeted column (item), in association with the raw data table (e.g., "set A"), is registered.

FIG. 6 illustrates one example of data stored in the set A. The set A includes the columns for ID, sex, amount, frequency of use, and others. The raw data table is a table that stores various business data, and is not limited to the set A exemplified in FIG. 6. Each of such raw data table is also represented by a "data group" in the present exemplary embodiment.

Figure 7:
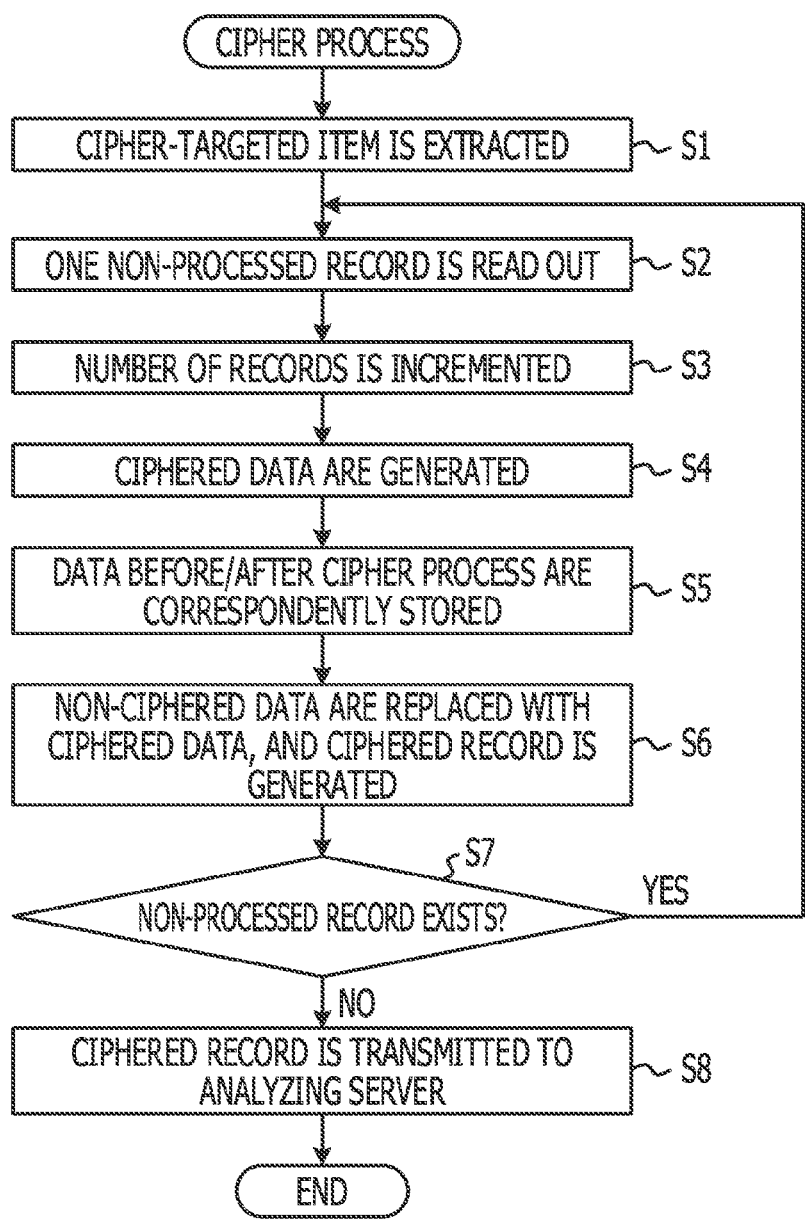
FIG. 7 is a view illustrating one example of a processing flow of a cipher process.

FIG. 7 illustrates the processing flow of the cipher process. First, the cipher processing unit 203 of the ciphering server 2 reads out the information indicating the cipher-targeted column which is registered in association with the raw data table, from the setting table (FIG. 7: S1). In the present exemplary embodiment, it is assumed that the "ID" information indicating the cipher-targeted column is registered in association with the raw data table "set A", and is read out. In other words, among the contents of records registered in the raw data table "set A" as illustrated in FIG. 6, the data (contents) registered in the column "ID" are ciphered in the present exemplary embodiment.

Next, the cipher processing unit 203 reads out one record that is not processed from the raw data table stored in the data storage unit 202 (S2). For example, the record on the first row in the set A illustrated in FIG. 6 is read out.

Then, the cipher processing unit 203 increments the number of records by 1 (S3). It is assumed that the "number of records" is temporarily stored in the data storage unit 202 until the cipher process on the set A is ended while counting, for example, the number of records in the set A, from 1.

Then, the cipher processing unit 203 generates ciphered data (S4). In the present exemplary embodiment, based on the order of reading-out of the record, that is, the position of the record, the ciphered data are generated. Since the ciphered data are generated irrespective of non-ciphered data (that is, contents), it is difficult for a third person to analogize the non-ciphered data from the ciphered data. Also, since the ciphered data are generated based on the position of the record in the set A, the ciphered data become unique values in the data registered in the cipher-targeted column in the set A. Accordingly, when the correspondent relationship between the non-ciphered data and the ciphered data is stored, the non-ciphered data may be uniquely identified from the ciphered data. Here, it is assumed that the ciphered data referred to as "A.Rec1" are generated by using the number of records incremented in S3.

Also, the method of generating the ciphered data is not limited to the method of generating data based on the position of the record. For example, the cipher processing unit 203 may generate random characters which become unique in the data registered in the cipher-targeted column, or may vary a ciphering method to be applied according to the record. For example, even if the method of generating the random characters is employed, it is difficult to analogize the non-ciphered data from the ciphered data. Also, when the randomly generated characters are employed as the ciphered data after confirmed to be completely different from ciphered data related to previously processed records, it is ensured that the non-ciphered data may be uniquely identified from the ciphered data.

Then, the cipher processing unit 203 stores the non-ciphered data correspondently with the ciphered data, in the cipher management data storage unit 204 (S5).

FIG. 8 illustrates one example of a cipher management table stored in the cipher management data storage unit 204. The cipher management table in FIG. 8 includes the columns of a data group, a ciphered item name, non-ciphered data and ciphered data. Then, as the contents of respective columns, "set A" that indicates the raw data table of targeted objects, "ID" that indicates the cipher-targeted column, "User-001" that indicates the non-ciphered data, and "A.Rec1" that indicates the ciphered data generated in S4, are registered.

Also, the cipher processing unit 203 replaces the non-ciphered data in the record read-out in S2 with the ciphered data to generate a ciphered record, and stores the ciphered record in a ciphered data table of the data storage unit 202 (S6).

FIG. 9 illustrates one example of data registered in the ciphered data table. The ciphered data table has the same columns as those in the raw data table. In S6, when the record noted on the first row in FIG. 6 is processed, the non-ciphered data "User-001" are replaced with the ciphered data "A.Rec1", and the record noted on the first row in FIG. 9 is generated. Data registered in other columns than the cipher-targeted column are the same as those registered in the raw data table, respectively.

Then, the cipher processing unit 203 determines whether a record that is not processed exists in the raw data table (S7). If the non-processed record exists (S7: Yes), the process proceeds back to the processing in S2. Then, the processes in S2 to S6 are repeated. For example, from the record noted on the second row in FIG. 6, the records noted on the second row in FIG. 8 and the second row in FIG. 9 are generated and stored in the cipher management data storage unit 204 and the data storage unit 202, respectively. Meanwhile, if the non-processed record does not exist (S7: No), the process proceeds to the processing in S8.

When it is determined that the non-processed record does not exist in S7, the transmitting unit 205 of the ciphering server 2 reads out the ciphered records registered in the ciphered data table, and transmits the read out records to the analyzing server 3 (S8). Then, the cipher process is ended.

As described above, in the present exemplary embodiment, since the ciphered data are generated irrespective of the non-ciphered data (that is, registered contents), it is difficult to analogize the non-ciphered data from the ciphered data. The ciphered record including such ciphered data is transmitted to the analyzing server 3.

<Analysis Process>

Hereinafter, a process of analyzing ciphered business data by the analyzing server 3 will be described. The analyzing server 3 may extract or compute data on non-ciphered items by using the ciphered business data. In other words, the analyzing server 3 may perform processing such as, for example, computation of the values registered in the non-ciphered column "amount" from the table in FIG. 9. However, since the column, "ID" is ciphered, it is impossible to perform processing such as, for example, computation of the values registered in the column "amount" in respective records having identical values in the column "ID" from the table in FIG. 9.

In order to allow such processing to be performed, the analyzing server 3 may inquire of the ciphering server 2 about a combination of ciphered data having identical non-ciphered data during the analysis process. Also, it is assumed that the receiving unit 301 of the analyzing server 3 has received a ciphered record from the ciphering server 2, and registered the received record in a ciphered data table of the data storage unit 302 in advance. For example, the ciphered business data "set A" illustrated in FIG. 9 are registered. Also, in the present exemplary embodiment, it is assumed that another ciphered record is also used in which a part of a raw data table "set B" that is different from "set A" is ciphered.

FIG. 10 illustrates another example of data stored in the raw data table "set B". The set B includes the columns of branch NO, Id, amount, type 1, and type 2. Also, among items included in the "set B", a cipher-targeted item is "Id", and ciphered business data illustrated in FIG. 11 are generated from the raw data illustrated in FIG. 10.

FIG. 11 illustrates another example of data stored in the ciphered data table. In the ciphered records of the set B, the ciphered data are registered in "Id". Also, in other columns than the cipher-targeted column, the same data as those in FIG. 10 are registered. Then, the data indicating the correspondent relationship between the data registered in the column "Id" before the cipher process and the data registered in the column "Id" after the cipher process are registered in a cipher management table.

FIG. 12 illustrates another example of data registered in the cipher management table. The cipher management table of FIG. 12 includes the columns of a data group, a cipher-targeted item, non-ciphered data, and ciphered data. In the present exemplary embodiment, it is assumed that the non-ciphered data and the ciphered data included in the set A and the set B are registered in one table. Hereinafter, based on the above described assumption, the analysis process will be described.

Figure 13:
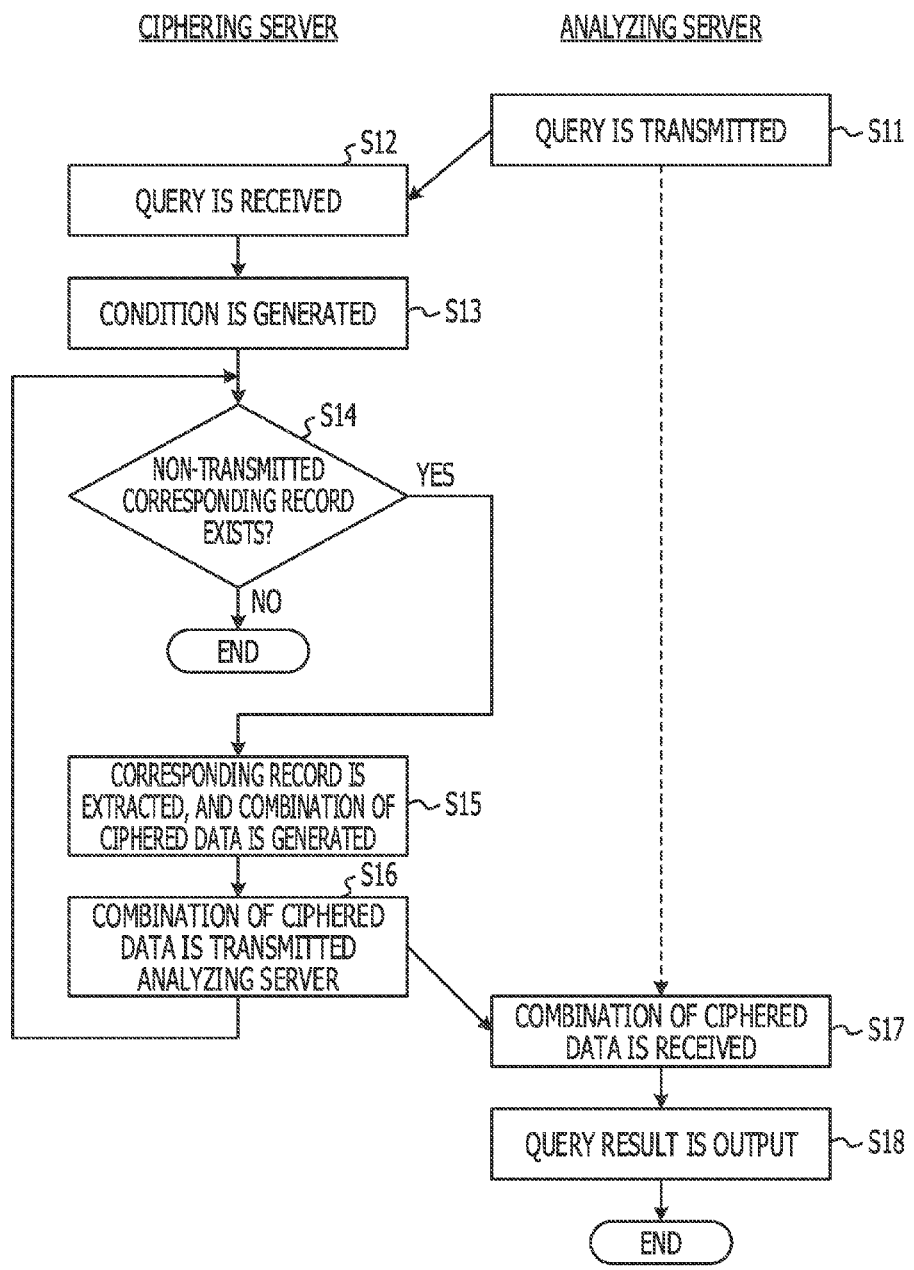
FIG. 13 is a view illustrating one example of a processing flow of an analysis process.

FIG. 13 illustrates the processing flow of an analysis process. First, the input unit 303 of the analyzing server 3 receives a processing request for performing the analysis process from a user via the input/output IF, and stores the received processing request in the data storage unit 302. For example, the user inputs the query of SQL as described below.

select set A. ID, set A. amount, set B. type 1, set B. type 2 from set A left outer join set B on (set A. ID=set B. Id)  (1)

Then, the transmitting unit 304 reads out the input processing request from the data storage unit 302, and transmits the read out request to the ciphering server 2 (FIG. 13: S11). In the present exemplary embodiment, the transmitting unit 304 transmits, for example, the query (SELECT statement) as it is. Also, it may be possible that a table name (that is, the name of a data group), and an item name (that is, a column name) included in the combination condition (1) of the query are extracted, and the processing request including the extracted table name and the extracted column name is transmitted by the transmitting unit 304. Meanwhile, the receiving unit 201 of the ciphering server 2 receives the processing request, and stores the received request in the data storage unit 202 (S12).

Then, the data extracting unit 206 reads out the processing request from the data storage unit 202, and generates a condition for extracting a record from the cipher management data storage unit 204 (S13). The data extracting unit 206 uses, for example, the table name and the item name included in the processing request to generate an extracting condition including the table name and the item name.

In the query described above, based on the combination condition, that is, 'on' clause (1), an extraction-targeted data group (that is, the table name) and a cipher-targeted item (that is, the item name) are identified from the cipher management table. Specifically, "set A", "ID", "set B" and "Id" are identified. Also, since the combination condition indicates that contents registered in the column are identical (in the 'on' clause, the column names are connected in "="), a condition that non-ciphered data are identical is added.

As the condition for extracting a record from the cipher management table, for example, the condition as described below is generated.

(data group="set A" and ciphered item name="ID" or data group="set B" and ciphered item name="Id") and, non-ciphered data are identical Also, although in the description of the present exemplary embodiment, a query including the combination condition is transmitted from the analyzing server 3 in S11, the query is not limited to such a SELECT statement. For example, a query including the extracting condition as exemplified below, or other various queries may be transmitted from the analyzing server 3.

where set A. ID=set B. Id  (2)

where set A. ID='A.Rec1'  (3)

where set B. Id like '% Rec % 2'  (4)

When the processing request includes the extracting condition (2) as described above (where clause), the extracting condition on the cipher management table is generated in the same manner as those in the above described 'on' clause.

Also, when the processing request is (3) as above, based on the extracting condition included in the processing request, an extraction-targeted data group and a cipher-targeted item name are identified first from the cipher management table. Specifically, the data group "set A" and the cipher-targeted item name "ID" are identified. Also, when the extracting condition indicates that the contents registered in the column are "A.Rec1", the contents of non-ciphered data of a record having "A.Rec1" registered in ciphered data are identified from the cipher management table, in which the extracting condition on the cipher management table indicates that the contents registered in the non-ciphered data are identical to the identified non-ciphered data contents.

In this case, as the condition for performing the extraction processing from the cipher management table, the condition as described below is generated.

data group="set A" and ciphered item name="ID" and in the column of non-ciphered data, contents which are identical to the identified non-ciphered data contents are registered.

Also, when the processing request is (4) as above, based on the extracting condition included in the processing request, an extraction-targeted data group and a cipher-targeted item are identified from the cipher management table. Specifically, the data group "set B" and the cipher-targeted item name "Id" are identified. Also, when the extracting condition indicates that the contents registered in the column are "% Rec %2", the contents of non-ciphered data of a record having "% Rec %2" registered in ciphered data are identified from the cipher management table, in which the extracting condition indicates that the contents registered in the column of the non-ciphered data are identical to the identified non-ciphered data contents. In other words, a record having data of "% Rec %2" registered in the column of the ciphered data, in which the wild card "%" of "% Rec %2" is replaced with any characters is identified from the cipher management table. Also, the contents of the non-ciphered data of the identified record are identified, and a condition that the identified contents are registered in the column of the non-ciphered data is added to the extracting condition.

In this case, as the condition for performing extraction processing from the cipher management table, the condition as described below is generated.

data group="set B" and ciphered item name="Id" and in the column of non-ciphered data, contents which are identical to the identified non-ciphered data contents are registered As described above, the data extracting unit 206, based on the processing request, generates an extracting condition for extracting a record from the cipher management table. As exemplified above, the extracting condition for extracting the record from the cipher management table is a condition that includes the item included in the processing request. Specifically, the extracting condition indicates that the contents registered in the item included in the processing request satisfy predetermined conditions. More specifically, the extracting condition indicates that identical values are registered in a plurality of items included in the processing request, or one or more values included in the processing request are registered in the items included in the processing request.

Then, based on the predetermined condition, the data extracting unit 206 determines whether or not there exists a record, as non-transmitted data, satisfying the predetermined condition (S14). In other words, the data extracting unit 206, based on the generated extracting condition, determines whether or not there exists data, as non-transmitted data, satisfying the extracting condition in the cipher management data storage unit 204. For example, the data extracting unit 206 may inquire of the cipher management data storage unit 204 by using SELECT statement, or may define a cursor using the extracting condition and then moves the cursor so that required data may be taken out (in other words, FETCH is performed). Also, when a corresponding record does not exist (S14: No), the process is ended.

Meanwhile, when the corresponding record exits (S14: Yes), the data extracting unit 206 extracts the corresponding record. Then, from extracted records, the data extracting unit 206 generates a combination of ciphered data registered in records having identical non-ciphered data, and stores the generated data in the data storage unit 202 (S15). When the processing request including the combination condition (1) as above is received, the data extracting unit 206 extracts the record on the first row and the record on the sixth record from the table in FIG. 12, and generates a combination of ciphered data included in the extracted records. For example, the combination illustrated in FIG. 14 is generated.

FIG. 14 is a view illustrating one example of a combination of ciphered data. The table illustrating the combination of the ciphered data includes the columns of item 1, ciphered data 1, item 2, and ciphered data 2. The combination of ciphered data having identical non-ciphered data is registered in the columns of "ciphered data 1" and "ciphered data 2". Also, the information indicating a table and the table's item where the data are registered is registered in the columns of "item 1" and "item 2". Here, the data group and the ciphered item name included in the query received in S12 are registered.

Then, the transmitting unit 205 reads out the combination of the ciphered data having the identical non-ciphered data from the data storage unit 202, and transmits the read out data to the analyzing server 3 (S16). Here, the combination of the ciphered data, as illustrated in FIG. 14, is transmitted. Then, the process proceeds back to the processing in S14, and the processes in S14 to S16 are repeated.

Meanwhile, the receiving unit 301 of the analyzing server 3 receives the combination of the ciphered data from the ciphering server 2, and stores the received data in the data storage unit 302 (S17). For example, the combination of the ciphered data, as illustrated in FIG. 14, is stored.

Then, the analysis processing unit 305 generates information indicating the result of the processing request (that is, query) input from the user, and the generated information is output to the user by the output unit 306 (S18). Specifically, the analysis processing unit 305 is stored in the data storage unit 302. Based on the combination of the ciphered data and the combination condition described in (1) above, the data of the ciphered data tables "set A" and "set B" stored in the data storage unit 302 are combined. From the information noted in FIG. 14, it can be seen that A.Rec1 registered in the ID column of the set A and B.Rec3 registered in the id column of the set B have identical non-ciphered data. As described above, by using the combination of the ciphered data received in S17, a combination of ciphered data having identical non-ciphered contents may be identified. Accordingly, the analysis processing unit 305, based on the combination condition described in (1) above, the data of the combination result, illustrated in FIG. 15, may be generated.

FIG. 15 illustrates one example of combined ciphered data. The table in FIG. 15 includes the columns of set A. ID, set A. amount, set B. type 1, set B. and type 2. These are items (columns) selected in the processing request (SELECT statement) input by the user in S11.

Also, in the combination result in FIG. 15, in the contents of the cipher-targeted ID column, the ciphered data are registered. Accordingly, there is no case where the data registered in the cipher-targeted item are known to a user of the analyzing server 3. As described above, in the present exemplary embodiment, while the non-ciphered data are not disclosed in the analyzing server 3, the analyzing server 3 may perform analysis on the ciphered business data. Also, when the analysis process ends, the analyzing server 3 deletes the information temporarily received during the process, such as, for example, a combination of ciphered data, from the data storage unit 302. Then, the analysis process is ended.

As described above, the analyzing server 3 receives data indicating a correspondent relationship of ciphered data within a range used for the analysis process, and temporarily stores a minimum correspondent relationship used for the process. Accordingly, the confidentiality of information becomes higher as compared to the case where the correspondent relationship of the ciphered data is always stored by the analyzing server 3. Also, especially, since the ciphered data are generated in such a manner that they have contents having no relationship to non-ciphered contents, it is difficult to analogize the non-ciphered data from the ciphered data. Accordingly, for example, when the private server 1 and the ciphering server 2 in FIG. 1 are disposed on a private network provided in stores or companies, and the analyzing server 3 is disposed on a public network such as, for example, the Internet, the analyzing server 3 may analyze the data via the private server while keeping confidentiality.

Also, in S14 to S18 in the present exemplary embodiment, whenever the data extracting unit 206 of the ciphering server 2 generates a combination of ciphered data having identical non-ciphered data, the data are transmitted to the analyzing server 3 first and then the analyzing server 3 performs processes in the order of the received data. Accordingly, in the case of the exemplified combination processing, in particular, as in a kind of pipeline processing, the ciphering server 2 and the analyzing server 3 may perform the processing in parallel, thereby suppressing reduction in the throughput.

21 Modified Example>

Hereinafter, a cipher process and a data analysis process will be described by using additional business data with reference to a modified example. In the present exemplary embodiment, using data stored by a plurality of hospitals, the number of hospitals where a patient has ever visited is counted, clinical histories are combined, and also the number of health insurance claims is counted on the patient having health insurance claim data in two or more hospitals. Also, although not described in the present exemplary embodiment, another method of utilizing data for help for research of preventive medicine by analyzing a group having similar clinical histories may be considered.

FIG. 16 to FIG. 18 illustrate, examples of health insurance claim data (raw data) stored by three hospitals. FIG. 16 is one example of raw data stored by the hospital A. The raw data table of the hospital A includes the columns of name, insured person number, disease, and health insurance claim. Also, in the present exemplary embodiment, it is assumed that individuals may be identified based on the insured person number.

Also, by combining the contents registered in a plurality of columns (items), a record may be uniquely identified. In other words, although individuals may be identified by "insured person number" in the present exemplary embodiment, the individuals may well be identified by a plurality of items such as, for example, "symbol" and "number". In this case, in a cipher management table, a correspondent relationship of data before and after a cipher process may be stored in each item, or the contents registered in a plurality of items may be coupled as one so that a correspondent relationship between the coupled data and ciphered data may be stored.

FIG. 17 is one example of raw data stored by the hospital B. The raw data table of the hospital B includes the columns of insured person number, name, age, disease, date of first medical examination, and health insurance claim.

FIG. 18 is one example of raw data stored by the hospital C. The raw data table of the hospital C includes the columns of name, insured person number, frequency, health insurance claim, and disease.

The raw data as described above are stored in data storage units 101A to 101C of private servers 1A to 1C included in the hospitals A to C. Then, transmitting units 102A to 102C of the private servers 1A to 1C transmit information stored in the raw data tables to the ciphering server 2. The plurality of private servers 1 and the ciphering server 2 are connected via, for example, dedicated line or a virtual private network (VPN).

Then, the receiving unit 201 of the ciphering server 2 receives data, and registers the received data in a raw data table stored in the data storage unit 202. Then, the cipher processing unit 203 performs a cipher process by using the raw data tables of the respective hospitals, and generates ciphered data tables illustrated in FIG. 19 to FIG. 21.

FIG. 19 is one example of a ciphered data table of the hospital A. The ciphered data table of the hospital A includes the columns of name, insured person number, disease, and health insurance claim. In the present exemplary embodiment, it is assumed that among the raw data illustrated in FIG. 16, the name and the insured person number are set to be cipher-targeted. Also, in the present system, the insured person number is a value uniquely defined on a patient, which is an item capable of associating records among a plurality of tables. Accordingly, the data registered in the column of the insured person number are replaced with unique data in each raw data table, based on, for example, a position of a record. Then, the data before/after the cipher process, which are registered in the column of the insured person number, are stored in the cipher management table. Meanwhile, in the present system, there is no case where the column of the name is used for identifying the relationship among records. Accordingly, the column may be subjected to a cipher process in the same manner as that in the insured person number, or may be ciphered so that non-ciphered data cannot be uniquely identified from ciphered data. In the example of FIG. 19, all data registered in the column of the name are indicated by "****". Also, a method of ciphering a cipher-targeted item is registered in, for example, a setting table, in advance.

FIG. 20 is one example of a ciphered data table of the hospital B. The ciphered data table of the hospital B includes the columns of insured person number, name, age, disease, date of first medical examination, and health insurance claim. In the present exemplary embodiment, it is assumed that among the raw data illustrated in FIG. 17, the insured person number and the name are set to be cipher-targeted. The data registered in the column of the insured person number are replaced with data that becomes unique in each raw data table, based on, for example, a position of a record. Also, in the column of the name of every record, "****" is registered.

FIG. 21 is one example of a ciphered data table of the hospital C. The ciphered data table of the hospital C includes the columns of name, insured person number, frequency, health insurance claim, and disease. In the present exemplary embodiment, it is assumed that among the raw data illustrated in FIG. 18, the name and the insured person number are set to be cipher-targeted. The data registered in the column of the insured person number are replaced with data that becomes unique in each raw data table, based on, for example, a position of a record. Also, in the column of the name of every record, "****" is registered.

Also, the ciphered data may be generated to become a unique value in data registered in a cipher-targeted item of one data group (table), or may be generated to become a unique value in data registered in cipher-targeted items of all of data groups processed by the ciphering server 2. In other words, in the cipher management table, the contents registered in the column of the ciphered data may be unique in records having identical contents registered in a data group and a column of the ciphered item name, or in all records of the cipher management table.

Also, a method of ciphering non-ciphered data, for example, by homomorphic encryption may be employed. Herein, the homomorphic encryption refers to an encryption method having homomorphy in which identical encryption keys are used so that identical ciphered data are generated from identical original data. By employing such a method, while anonymity is stored by ciphering, records may be associated in ciphered data.

However, there is a disadvantage in that the relationship between data and records may be analogized because when original contents are identical, ciphered contents are also identical. In other words, when a third person extracts records having identical ciphered contents from a ciphered table, and draws analogy by using non-ciphered contents as clues, there is a possibility that the third person may infer the non-ciphered contents (e.g., a specific individual). Accordingly, the confidentiality of a system is improved in the method based on a position of a record, or the method employing a random value as described above, and the risk of information leakage is reduced.

Also, the cipher processing unit 203 generates the ciphered data, while storing a combination of data before/after the cipher process in the cipher management table. For example, it is assumed that in the setting table, the item (column) of a target of which data before/after the cipher process are to be stored is registered in advance. Then, as the combination of the data before/after the cipher process, for example, the record as illustrated in FIG. 22 is registered.

FIG. 22 is one example of the cipher management table. In the present exemplary embodiment, the data structure of the cipher management table is the same as that in the cipher management table illustrated in FIG. 12. Also, as the contents of the cipher management table, the data registered in the columns of the insured person number in the raw data tables illustrated in FIG. 16 to FIG. 18 and the ciphered data tables illustrated in FIG. 19 to FIG. 21, are correspondently registered. Then, the ciphering server 2 transmits ciphered business data to the analyzing server 3, as illustrated in FIG. 19 to FIG. 21.

Meanwhile, the analyzing server 3 performs various analysis processes on the ciphered business data. In the case of the health insurance claim data of hospitals, as described in the present exemplary embodiment, for example, statistical calculation of medical expenses, or analysis of a clinical history may be performed. However, in the present exemplary embodiment, the data that may associate records (that is, insured person number) are ciphered. Accordingly, the analyzing server 3 transmits a processing request to the ciphering server 2, and obtains a combination of ciphered data having non-ciphered data satisfying a predetermined condition.

The analyzing server 3 transmits, for example, a query of SQL, as the processing request, to the ciphering server 2. The processing request is not limited to the query as described above. For example, when the processing request includes a table name and a column name (item name), the ciphering server 2 may extract a combination of ciphered data having non-ciphered data satisfying a predetermined condition, from the cipher management table.

Also, although not illustrated, a plurality of kinds of ciphered data having identical non-ciphered data may exist in one ciphered data table. In other words, when the same patient has visited the same hospital plural times, a plurality of health insurance claim data (that is, records) may be registered. In such a case, all ciphered data having identical non-ciphered data (that is, related to the same patient) may be transmitted to the analyzing server 3 as one combination. In this manner, health insurance claim data of each patient may be counted.

Also, in S11 of FIG. 13, although a user inputs the processing request in the above description, the user himself may not input the query in another exemplary embodiment. For example, an application provided with a Graphical User Interface (GUI) that supports making out of the query may generates the query based on the operation of the user, or the processing request may be transmitted from the analyzing server 3, for example, during previously set batch processing without receiving input from the user. Also, the ciphering server 2 may automatically extract and transmit a combination of ciphered data based on a predetermined condition without receiving the processing request from the analyzing server 3.

Upon receiving the processing request from the analyzing server 3, the ciphering server 2 extracts the combination of ciphered data. For example, from the cipher management table as illustrated in FIG. 22, a combination of ciphered data as illustrated in FIG. 23 is generated. Also, in the above described exemplary embodiment, the obtaining of the combination of the ciphered data having the identical non-ciphered data is exemplified. However, a combination of ciphered data of which at least a portion of non-ciphered data are identical may be obtained. For example, it is assumed that high order predetermined digits of the insured person number are unique values in each region or each company. Then, such assumption is assumed to be known. In such a case, during counting on each region or each company, the analyzing server 3 may transmit a processing request including a portion of non-ciphered data together with a wild card to the ciphering server 2, and the ciphering server 2 may returns back a list (combination) of ciphered data of which a portion of the non-ciphered data are identical to the analyzing server 3.

FIG. 23 illustrates one example of a table illustrating a combination of ciphered data. The table in FIG. 23 includes the columns of item 1, ciphered data 1, item 2, ciphered data 2, item 3, and ciphered data 3. In the respective columns, combinations of ciphered data that have non-ciphered data satisfying a predetermined condition (herein, contents registered in non-ciphered data are identical) are registered. The ciphering server 2 generates such a combination of ciphered data, and transmits the generated data to the analyzing server 3.

Meanwhile, upon receiving the combination of the ciphered data from the ciphering server 2, the analyzing server 3 stores the received combination of the ciphered data in the data storage unit 302. Then, the analysis processing unit 305 performs an analysis process by using the ciphered data tables noted in FIG. 19 to FIG. 21, and the combinations of the ciphered data illustrated in FIG. 23. As described above, in the present exemplary embodiment, the analysis process "for each patient having health insurance claim data in two or more hospitals, the number of hospitals with an outpatient history is counted, clinical histories are combined, and also the number of health insurance claims is counted" is performed. For example, the analysis processing unit 305 performs a plurality of queries on the ciphered data tables, and counts and edits obtained information to generate resultant data. The analysis processing unit 305 may generate, as a processing result, for example, the table as illustrated in FIG. 24.

FIG. 24 is a table illustrating one example of a processing result. The table illustrated in FIG. 24 includes the columns of insured person number, number of hospitals, disease 1, disease 2, disease 3, disease 4, disease 5, and total of health insurance claims. In order to obtain such a resultant table, for example, counting and editing are performed as described below.

In other words, in the present exemplary embodiment, as for "a patient having an outpatient history in two or more hospitals", the patients in two records of which the combinations of the ciphered data are obtained as illustrated in FIG. 23 are extract-targeted in the processing. Also, "the number of hospitals with the outpatient history" is obtained by counting the number of hospitals included in each record in FIG. 23 except duplications. Then, the list illustrated in FIG. 24 may be generated as "clinical history" in which the ciphered insured person number included in each record in FIG. 23 is used to obtain and combine the data registered in the columns of disease from the ciphered data tables. Also, "total of the number of health insurance claims" is obtained by obtaining data registered in the columns of health insurance claim from the ciphered data tables and counting the number of health insurance claims in each record (one row) in FIG. 23, by using the ciphered insured person number included in each record of FIG. 23. Such processing is exemplary only, and the analysis processing unit 305 may perform various counting, editing, and other processing.

As described above, in the technology according to the present exemplary embodiment, since ciphered data are generated irrespective of the contents of non-ciphered data, it is difficult to analogize the non-ciphered data. At the same time, in terms of utilizing data, a ciphered record that has non-ciphered data satisfying a predetermined condition may be appropriately obtained from the ciphering server 2. Thus, as an effect of the present disclosure, it becomes easy to utilize the ciphered data.

<Effect>

A technology of allowing ciphered data to be easily utilized may be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A non-transitory computer-readable storage medium storing a data processing program for causing a computer to execute a process for ciphering received data from one or more apparatuses that generate data and outputting ciphered data to an external device that performs an operation to the ciphered data, the process comprising:

generating a first ciphered data and a second ciphered data by ciphering data of an item included in a first data and a second data in a way that the data of the item is unidentifiable by the external device, the first data and the second data being received from the one or more apparatuses, the second data including the data of the item included the first data;

storing correspondently the first data and the first ciphered data in a storage;

storing correspondently the second data and the second ciphered data in the storage;

identifying, upon receipt of a request for a set of data associated with unciphered data of the item, a first combination of the first data and the second data based on the request and stored data having the data of the item;

extracting a second combination of the first ciphered data and the second ciphered data stored respectively and correspondently to the first data and the second data identified by the identifying; and transmitting the second combination of the first ciphered data and the second ciphered data extracted by the extracting to the external device.

2. The computer-readable storage medium according to claim 1, wherein the identifying identifies the first combination of the first data and the second data of which at least a portion of contents are identical from the storage, and the extracting extracts the second combination of the first ciphered data and the second ciphered data stored respectively and correspondently to the first data and the second data identified by the identifying.

3. The computer-readable storage medium according to claim 1, wherein the first ciphered data are data generated irrespective of the first data so that the first data are uniquely identified based on the first ciphered data, and the second ciphered data are data generated irrespective of the second data so that the second data are uniquely identified based on the second ciphered data.

4. The computer-readable storage medium according to claim 1, wherein the first data are values of a first item included in the first record, and the second data are values of a second item included in the second record, the process further comprising:

receiving a query of request for at least one of the first record and the second record, the query including a condition indicated by using at least one of the first item and the second item.

5. The computer-readable storage medium according to claim 1, wherein the data of the item is ciphered by replacing the data of the item with different data independent of the unciphered data of the item.

6. The computer-readable storage medium according to claim 1, wherein the data of the item is ciphered by using a position of record of the stored unciphered data in the storage.

7. A non-transitory computer-readable storage medium storing a data processing program for causing a computer to execute a process, the process comprising:

receiving a first combination of first ciphered data and second ciphered data having identical non-ciphered values; and at least one of extracting at least one of a first ciphered record and a second ciphered record from a storage and counting the first ciphered record and the second ciphered record, based on the combination received, the storage storing the first ciphered record obtained by replacing first data with the first ciphered data and the second ciphered record obtained by replacing second data with the second ciphered data, the first data and the second data being received from one or more apparatuses, the second data including data of an item included the first data, the first data being stored in correspondence with the first ciphered data and the second data being stored in correspondence with the second ciphered data; and wherein a second combination of the first data and the second data is extractable in correspondence with the first ciphered data and the second ciphered data in the first combination received.

8. A data processing apparatus comprising:
a storage device; and
a processor coupled to the storage device and configured to:
    extract a first combination of the first data and the second data based on a condition from the storage device in which the first data and first ciphered data obtained by ciphering the first data are correspondently stored, and the second data and second ciphered data obtained by ciphering the second data are correspondently stored, the first data and the second data being received from one or more apparatuses, the second data including data of an item included the first data, the first data being stored in correspondence with the first ciphered data and the second data being stored in correspondence with the second ciphered data, and
    extract a second combination of the first ciphered data and the second ciphered data stored respectively and correspondently to the first data and the second data extracted according to the first data and the second data identified in the first combination received.

9. The data processing apparatus according to claim 8, wherein the processor is configured to:
    identifying the first combination of the first data and the second data of which at least a portion of contents are identical from the storage device, and
    extract the second combination of the first ciphered data and the second ciphered data stored respectively and correspondently to the first data and the second data identified.

10. The data processing apparatus according to claim 8, wherein
    the first ciphered data are data generated irrespective of the first data so that the first data are uniquely identified based on the first ciphered data, and
    the second ciphered data are data generated irrespective of the second data so that the second data are uniquely identified based on the second ciphered data.

11. The data processing apparatus according to claim 8, wherein
    the first data are values of a first item included in the first record, and
    the second data are values of a second item included in the second record,
    the processor is configured to receive a query of request for at least one of the first record and the second record, the query including a condition indicated by using at least one of the first item and the second item.

12. A data processing system comprising:
a first apparatus including a first storage and a first processor; and
a second apparatus including a second storage and a second processor,
wherein
the first processor is configured to:
    extract a first combination of first data and second data based on a condition from the first storage in which the first data included in a first record and first ciphered data obtained by ciphering the first data are correspondently stored, and the second data included in a second record and second ciphered data obtained by ciphering the second data are correspondently stored, and
    extract a second combination of the first ciphered data and the second ciphered data stored respectively and correspondently to the first data and the second data extracted according to the first data and the second data identified in the first combination,
the second processor is configured to:
    receive the second combination of the first ciphered data and the second ciphered data from the first apparatus, and
    process a first ciphered record and a second ciphered record based on the second combination, the second storage storing the first ciphered record obtained by replacing the first data in the first record with the first ciphered data, and the second ciphered record obtained by replacing the second data in the second record with the second ciphered data.

* * * * *